United States Patent
Gasselin de Richebourg et al.

(10) Patent No.: US 10,115,183 B1
(45) Date of Patent: Oct. 30, 2018

(54) APPEARANCE FOR ROTATING USER INTERFACE ELEMENTS

(71) Applicant: Apple Inc., Cupertino, CA (US)

(72) Inventors: Jacques P. Gasselin de Richebourg, Cupertino, CA (US); Domenico P. Porcino, Cupertino, CA (US); Nathaniel C. Begeman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 14/475,387

(22) Filed: Sep. 2, 2014

(51) Int. Cl.
*G06T 3/60* (2006.01)
*G06T 5/00* (2006.01)
*G06T 5/10* (2006.01)

(52) U.S. Cl.
CPC ............ *G06T 3/60* (2013.01); *G06T 5/003* (2013.01); *G06T 5/10* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 6,785,409 B1* | 8/2004 | Suri | G06T 7/0012 382/106 |
| 9,020,272 B1* | 4/2015 | Esfahbod Mirhosseinzadeh Sarabi | G06K 9/481 382/197 |
| 2003/0077000 A1* | 4/2003 | Blinn | G06T 3/4007 382/260 |
| 2009/0161983 A1* | 6/2009 | Ciurea | G06T 5/20 382/275 |
| 2012/0057781 A1* | 3/2012 | Morovic | G06T 7/408 382/164 |

* cited by examiner

*Primary Examiner* — Kyle Zhai
(74) *Attorney, Agent, or Firm* — Brownstein Hyatt Farber Schreck, LLP

(57) ABSTRACT

Embodiments of the present disclosure are directed to methods and systems for displaying an image on a user interface. The methods and systems include components modules and so on for determining a minimum feature width of the image and determining and a distance field of each region associated with the image. The distance field of each region may be based on the minimum feature width. A filter threshold associated with the distance field is then determined and the image is output using the determined filter threshold.

18 Claims, 7 Drawing Sheets

APPEARANCE FOR ROTATING USER INTERFACE ELEMENTS

TECHNICAL FIELD

The present disclosure is directed to displaying images on a user interface. More specifically, the present disclosure is directed to displaying rotating elements or images on a user interface in such a manner as to preserve, the sharpness of the user interface element, the perceived feature width of the user interface element and luminance of the user interface element as the user interface element rotates on the display.

BACKGROUND

When images are output on a display, the images are normally constrained to a grid in both a horizontal and a vertical direction. As such, the images typically need to be anti-aliased in order to improve and/or approximate the image that is being rendered on the display. For example, as an image is being output on the display, the image may undergo an anti-aliasing process in which jagged edges of the displayed image are smoothed or blurred in order to add greater realism to the displayed image. In addition, various pixels that surround the edges of a line of the image may be changed to varying shades of gray or varying shades of color in order to blend the pixels of the image into a background of the image.

In typical anti-aliasing techniques, when an image is output on the display, a filter width is calculated for each pixel in the image. An area of coverage for each pixel is then determined. Each pixel may then be analyzed to determine whether the pixel needs to be blurred or blended with respect to other pixels in the grid in order to achieve sharp edges, corners and so on.

However, as discussed above, typical anti-aliasing solutions deal with images that are constrained to a grid in both a horizontal direction and a vertical direction. Thus, as an image rotates on a display, the filter width of the anti-aliasing filter that was applied on the vertical and/or horizontal grid may no longer provide the desired sharpening effect. For example, as the image rotates, the anti-aliasing filter may get wider. Because the filter width is wider than was originally intended, the pixels of the rotated image may not be anti-aliased as originally intended. As such, the rotated image may not look as smooth or as crisp when rotated. In addition, rotation of the image may yield a perceived luminance difference between the image as originally rendered and the rotated image.

It is with respect to these and other general considerations that embodiments have been made. Although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide a method for displaying an image on a user interface. The method includes determining a minimum feature width of the image and determining a distance field of each region associated with the image. In embodiments, the distance field of each region is based on the minimum feature width. A filter threshold associated with the distance field is then determined and the image is output using the determined filter threshold. As will be explained below, the filter threshold remains constant as the image is rotated.

Also disclosed herein is a computer-readable storage medium storing computer executable instructions for performing a method for outputting an image on a display. The method includes determining a distance field value for each region in the image. The distance field value is a representation of a distance between each region and a pixel boundary associated with the image. The distance field value for each region is maintained as the image rotates on the display.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein.

In general terms, the embodiments described herein may be used to render images, graphics, user interface elements and the like (collectively referred to herein as images) on a display. The rendered images may be stationary images, images that are rotating or appear to be rotating on the display, and images that may be rotated. For example, an image that is output on a display of an electronic device may rotate about an axis periodically as it is being displayed. Accordingly, the methods and systems described herein may be used to render such an image such that the image appear crisp and sharp in every orientation as it rotates. In addition, even if an image is static or otherwise unmoving, the embodiments described herein may also be used to render such static images on the display.

Unlike typical anti-aliasing solutions in which an anti-aliasing filter width for the pixels or the image changes as an image rotates, embodiments disclosed herein describe a process to determine a filter width for an image that remains constant regardless of any movement (rotational or otherwise) of the image. Because the filter width of the image remains constant as the image rotates, the rotating image appears the same (e.g., luminance, sharpness and so on) as when it was originally created as it does in a first orientation and in a second orientation.

Because the image is output in a manner that automatically compensates for the rotation of the image, additional processing need not occur each time the image is rotated or output in varying orientations. In addition to the advantages set forth above, the cost per pixel in terms of processing power in the disclosed embodiments is less than the cost of changing the filter width associated with an image each time the image rotates as may be required of typical anti-aliasing techniques.

Figure 1A:
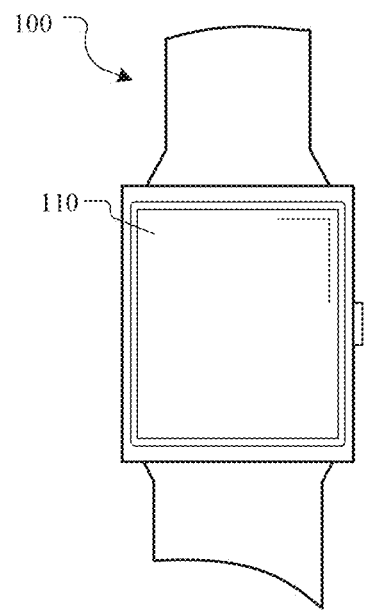
FIG. 1A illustrates an exemplary computing device that may be used to display rotating user interface elements according to one or more embodiments of the present disclosure.
Figure 1B:
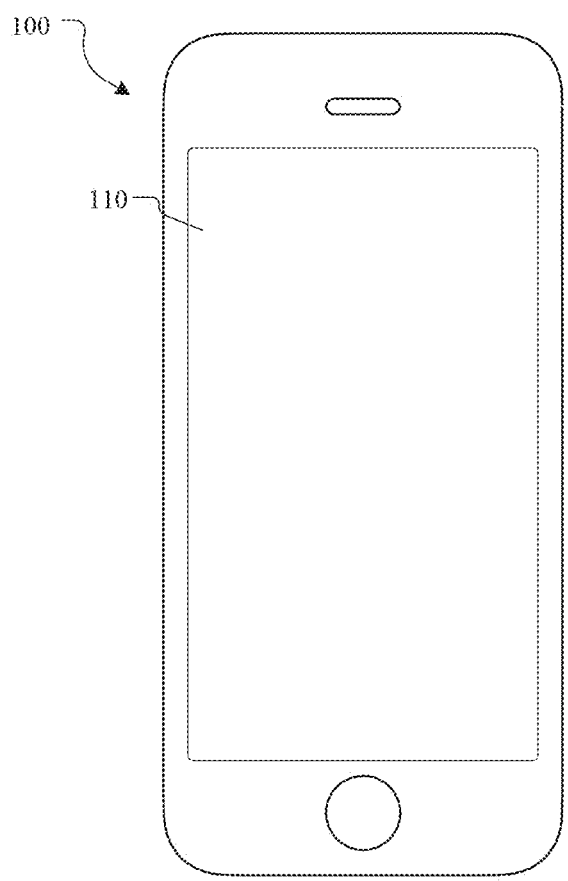
FIG. 1B illustrates another exemplary computing device that may be used to display rotating user interface elements according to one or more embodiments of the present disclosure.
Figure 1C:
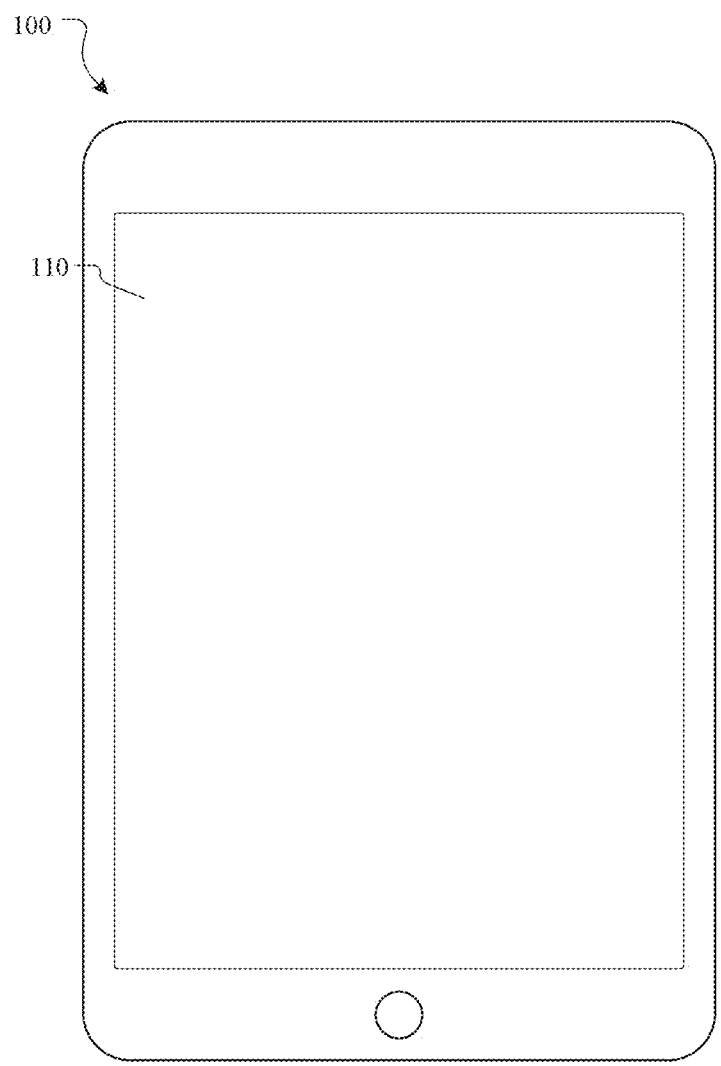
FIG. 1C illustrates another exemplary computing device that may be used to display rotating user interface elements according to one or more embodiments of the present disclosure.

FIG. 1A illustrates an exemplary computing device 100 that may be used to present one or more images according to embodiments of the present disclosure. In certain embodiments, the computing device 100 may be a wearable computing device. In another embodiment, the computing device 100 may be a mobile telephone (such as shown in FIG. 1B), a tablet computer (such as shown in FIG. 1C), laptop computer, a time keeping device, computerized glasses, navigation devices, sports devices, portable media players, health devices, medical devices and so on.

As shown in FIG. 1A (and also shown in FIG. 1B and FIG. 1C), the computing device 100 may include a display 110. The display 110 may be used to provide or otherwise output information that is stored in a memory of the computing device 100. For example, the display 110 may present information corresponding to one or more applications that are executed or stored on a memory of the computing device 100. Such applications may include an email application, a phone application, a calendaring application, a game application, a time keeping application, a health monitoring application and so on.

Each application that is executed on the computing device 100 may have one or more images that are rendered or otherwise output on the display 110. In some cases, the displayed images may be rotated or otherwise output in various orientations on the display 110. For example, if an image is rendered on the display 110 and the computing device moves from a first orientation to a second orientation, the rendered image may be rotated in response to the determined changed in orientation of the computing device 100.

That is, the display 110 of the computing device may be configured to output images in a first orientation in response to a first determined orientation of the computing device 100. Further, the display 110 may also be configured to output images in a second orientation in response to a second determined orientation of the computing device 100.

In other embodiments, the image itself may be rotated as it is rendered on the display 110. The rotation of the image may occur regardless of an orientation of the electronic device 100. For example, if the computing device 100 is executing a time keeping application, an hour hand, a minute hand and a second hand may be rendered on the display 110. Further, each of the hour hand, the minute hand and the second hand may be rotated about an axis at discrete time intervals while being rendered on the display 110. As such, the embodiments described herein may be used to rotate and render these images on the display 110 such that the original intent of each of the images, and a luminance of each of the images, is preserved regardless of the rotation or orientation of the image and/or the computing device 100.

In another embodiment, the application executing on the computing device 100 may be a gaming application and may render various images in a variety of orientations, for example as a user moves the device or in response to a user input. As such, the embodiments described herein may be used to render such images for the gaming application. For example, if a portion of a rendered image needs to be rotated based on different views and/or positions of an avatar or the like, the embodiments described herein may be used to quickly and efficiently rotate an image or rotate various portions of the image.

In certain embodiments, the image that is to be rendered on the display 110 is initially generated and/or stored on the electronic device as vector image. A vector image uses geometric primitives such as points, lines, curves, shapes, polygons and so on to represent the vector image. In contrast to a vector image, a pixel based image is generated by a combination of pixels on a grid.

Although the various images may be stored on the computing device 100 as vector images, which are easily scalable and thus, may be more easily rotatable, the display 110 of the computing device may be configured to output rasterized (e.g., pixelated) images. As such, the vector images may need to be converted to pixel images. However, pixilated images may not be easily rotatable or scaleable.

Regardless of the above, in certain embodiments disclosed herein, the vector images are converted into pixelated images for the purpose of rotation. However, in the disclosed embodiments, the pixelated images are configured to store information about various characteristics of the original vector image. These characteristics include the points, lines, curves etc., of the original vector image. As a result, when the pixilated image is rendered on the display, the pixilated image may have retained the characteristic data of the vector image such that the pixilated image can be displayed as in a way that is substantially equivalent to the vector image.

In line with the above, the vector image may be quantized onto a pixel grid. More specifically, the vector image that is stored on the electronic device 100 may be rasterized (e.g., converted into pixels) for output the display 110. Although the vector image has been rasterized, the rasterized version of the vector image maintains the full resolution of the vector image. Because the full resolution of the vector image is retained, the rasterized version of the vector image may be equivalent to the original vector image.

More specifically, because the rasterized version of the vector image maintains the full resolution of the vector image, the information about the characteristics of the vector image (e.g., the points, lines, curves, shapes, polygons etc. that represents the vector image) are also maintained. As a result, the points, lines, curves, shapes etc. of the vector image is maintained through any affine transformations that may occur on the pixelated image.

In typical solutions, when a vector image is rasterized, information about a location of each pixel may be stored in a grid. Put another way, when a vector image is rasterized, a quantization grid may be generated which indicates, for each region of the quantization grid, whether or not a pixel should be present in that region.

In contrast, when a vector image is rasterized according to embodiments of the present disclosure, a distance field or quantization grid is generated in which each region of the quantization grid indicates a distance value regardless of whether a pixel is present in the region. More specifically, each region in the quantization grid of the present disclosure indicates a distance that that particular region is away from a pixel boundary of the image. For example, when a particular point on the quantization grid is selected, a determination may be made as to how far that particular point on the quantization grid is away from a pixel boundary of the image. This will be described in more detail below with respect to FIG. 3B and FIG. 3C.

In certain embodiments, the pixel boundary of an image may be an outer pixel boundary or an inner pixel boundary. The outer pixel boundary may be a pixel boundary that is on the outside or an outer edge of the image. Likewise, the inner pixel boundary may be a pixel boundary that is on the inside of the image or on an inner edge of the image.

In order to distinguish between an inner pixel boundary and an outer pixel boundary, each value in each region of the quantization grid may be a positive value or a negative value. For example, if a particular point is on the outside of the image, the distance field value stored in that region of the quantization grid may be a positive value. Likewise, if a particular point is located on the inside of the image, the distance field value stored in that region of the quantization grid may be a negative value.

Because the quantization grid stores both positive and negative values, each of which represent distance values, the quantization grid of the present disclosure may be referred to herein as a signed distance field. Using the signed distance field, a determination may be made as to whether a given point is inside or outside a particular image based on whether the value on in the grid is either positive or negative. As will be explained below, the values stored in the signed distance field may also be used to determine what portions of the pixelated image are to be anti-aliased.

As will also be explained below, the information stored in the signed distance field may be maintained regardless of the rotation or orientation of the image that is rendered on the display. Accordingly, when the image is rotated, any point on the distance field will indicate how far that particular point is away from a pixel boundary and whether that particular point is located inside the image or outside the image.

In certain embodiments, when a point on the distance field is selected, a distance value for that particular point is calculated. The calculation of the distance value for a particular point is based on values that are stored in neighboring regions of the distance field. For example, when a particular point in the distance field is selected, a texture sampler may sample neighboring regions of that particular point to obtain distance values of each neighboring region. The distance values stored by each surrounding neighbor are summed and multiplied by some fractional distance, such as, for example, the distance that the particular point is from a center of the image. The resulting distance will indicate how far that particular point is away from a pixel boundary. This will be explained in greater detail below. In embodiments, the resulting distance may be a fractional distance or a whole distance.

In some embodiments, a pixel boundary may have a zero value. As such, fractionally encoding distances may enable a level of granularity to be achieved with respect to the pixel boundary that was not previously available. As such, the output image, or more specifically, lines of the output image may be crisp and sharp in any rotation or orientation as straight lines are preserved.

For example, because fractional distances may be used, it may be determined that a first point has a distance value of 0.08 thereby indicating that the first point is almost squarely on a particular pixel boundary. Because the first point is almost squarely on the pixel boundary, that point may need to be slightly anti-aliased or may not need to be anti-aliased at all. However, if second point in the quantization grid had a distance value of 0.15, the second point may be found to be partially on a pixel boundary and partially off the pixel boundary. As such, an anti-aliasing filter may need to be applied to the second point (e.g., to blur the portion of the pixel that is not on the pixel boundary).

Referring back to FIG. 1A-FIG. 1C, the computing device 100 may include other components and modules (although not shown) including a microphone, a processor, a memory, a haptic actuator, a light source and other such components. These specific components, as well as other components of an exemplary computing device 100 are shown below with respect to FIG. 6.

Additionally, the computing device 100 may include one or more components that enable the computing device 100 to connect to the internet and/or access one or more remote databases or storage devices. The computing device 100 may also enable communication over wireless media such as acoustic, radio frequency (RF), infrared, and other wireless media mediums. Such communication channels may enable the computing device 100 to remotely connect and communicate with one or more additional devices such as, for example, a laptop computer, tablet computer, personal digital assistant, portable music player, speakers and/or headphones and the like.

The computing device 100 may also be configured to provide haptic output to notify a user of each computing device of a particular condition of the computing device. For example, computing device 100 may provide a haptic output, a visual notification, an auditory notification or a combination thereof to notify a user of a particular event, message, notification and so on.

Figure 2:
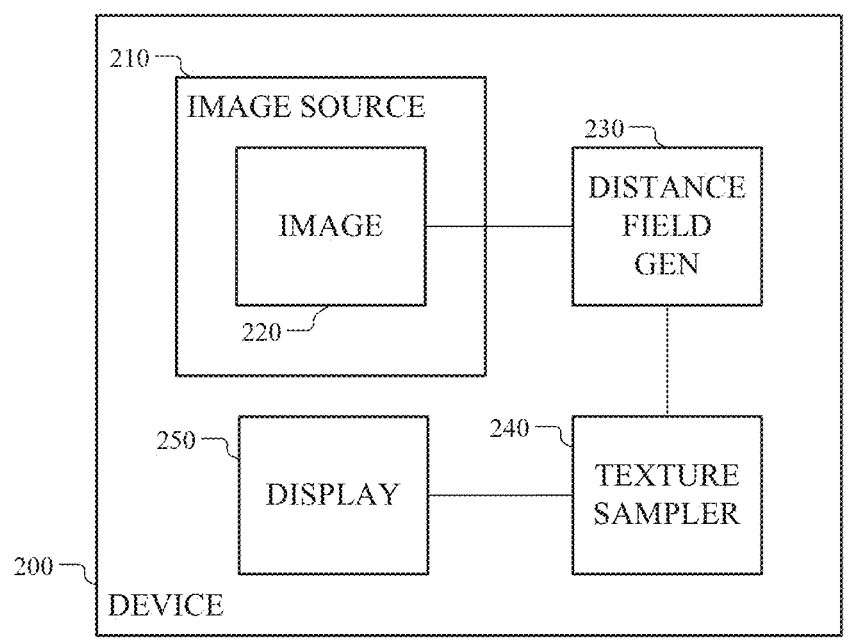
FIG. 2 is a block diagram that illustrates various components of a computing device that may be used to display rotating user interface elements according to one or more embodiments of the present disclosure.

FIG. 2 illustrates a block diagram of various components of a computing device 200 that may be used to display rotating user interface elements according to one or more embodiments of the present disclosure. In certain embodiments, the computing device 200 may be similar to computing device 100 shown and described above with respect to FIG. 1A-FIG. 1C.

As shown in FIG. 2, the computing device 200 may include an image source 210 configured to store an image 220. In certain embodiments, the image source 210 may be a memory device or other such storage device that is local to the computing device 200. In another embodiment, the image source 210 may be configured to retrieve one or more images from a remote source, such as, for example, another computing device.

In certain embodiments, the image 220 stored in the image source 210 is an image that is to be rendered and rotated on a display 250 of the computing device 200. More specifically, the image 220 may be rotated on the display 250 at discrete time periods although this is not required.

As discussed above, the image 220 may be initially generated and/or stored by the image source 210 as a vector image. However, prior to rendering the vector image on the display 250, the vector image may be rasterized to generate a pixelated image. As discussed above, the pixilated image may maintain the full resolution (e.g., is not compressed) of the image so that the pixilated image in equivalent to the original image 220.

In certain embodiments, the image source 210 may be configured to rasterize the image 220 and subsequently store the rasterized image. In another embodiment, the image source 210 may be configured to send the image 220 to a rasterizing module (not shown) which converts the image 220 from a vector image to a pixel image. In yet another embodiment, when the image 220 is initially generated and/or stored in the image source 210 as a vector image, a corresponding pixilated image may also be created and/or stored in the image source 210.

Once the image 220 has been pixilated, the pixilated image (or the original image) may be provided to a distance field generator 230. The distance field generator 230 may be configured to determine distance values for each region in the quantization grid. More specifically, the distance field generator 230 may be used to assign a distance value of each region of the distance field with respect to how far that region is away from a pixel boundary of the image 220.

Once the distance field for the pixelated image has been determined by the distance field generator 230, a texture sampler 240 receives the pixelated image and its associated quantization grid. The texture sampler 240 may then use a scan line rasterization process to determine distance values of various points on the quantization grid. More specifically, and as will be described in more detail below, when the scan line rasterization process selects a particular point on the quantization grid, the texture sampler is configured to obtain distance values from neighboring regions of the quantization grid. These distance values are then summed and multiplied by a distance value (e.g., a fractional distance value that represents a distance the particular point is away from the center of the image) which determines a fractional distance that the particular point is away from a pixel boundary. Further, as the computed distance value of the point may be negative or positive, the fractional distance value may also indicate whether the particular point is inside the image 220 or outside the image 220.

More specifically, once the fractional distance value is obtained for the particular point, a determination may be made as to whether the point is near a pixel boundary, outside a pixel boundary or inside a pixel boundary. Based on this determination, one or more anti-aliasing filters may be applied to a pixel that is to be displayed that particular point. The above process may repeat for various points along on the quantization grid. Once the process has completed, the image may be rendered on the display 250.

Figure 3A:
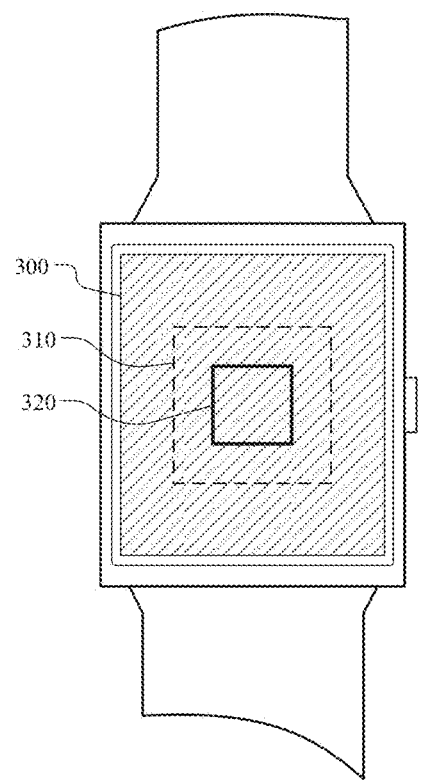
FIG. 3A illustrates an exemplary electronic device having a display for rendering one or more user interface elements according to one or more embodiments of the present disclosure.

FIG. 3A illustrates an exemplary electronic device having a display 300 for rendering one or more user interface elements 320 according to one or more embodiments of the present disclosure. In certain embodiments, the electronic device may be similar to the electronic device 100 shown and described above with respect to FIG. 1A-FIG. 1C.

As shown in FIG. 3A, a user interface element 320 may be output on the display 300. In certain embodiments, the user interface element 320 may be similar to the various images discussed above with respect to FIG. 1A-FIG. 2. Accordingly, the user interface element 320 may be an image that may rotate about an axis on the display 300 using the embodiments described herein.

In certain embodiments, the display 300 may render multiple user interface elements 320 at the same time or substantially similar times. Further, multiple user interface elements 320 may be displayed in sequence. In either case, each user interface element may have its own distance field, filter width and so on. Further, each user interface element 320 may be rotated separately, concurrently or substantially concurrently.

As also shown in FIG. 3A, the user interface element 320 may be constrained by an image boundary 310. The image boundary 310 may set the overall size of the user interface element 320. Thus, as the user interface element 320 is being rendered and/or rotated on the display 300, the user interface element 320 remains within the image boundary 310. In some embodiments, as the user interface element 320 rotates, the image boundary 310 rotates accordingly.

Figure 3B:
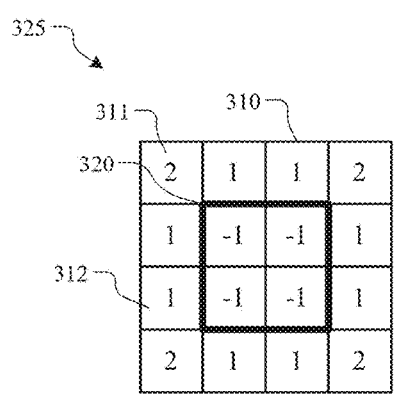
FIG. 3B illustrates a quantization grid associated with a user interface element according to one or more embodiments of the present disclosure.

FIG. 3B illustrates an exemplary quantization grid 325 (or signed distance field) of a user interface element 320 according to one or more embodiments of the present disclosure. As shown, in FIG. 3B, each region of the quantization grid 325 has a value contained therein that represents a distance that each region is away from a pixel boundary. For example region 311 has a distance value of 2 while region 312 has a distance value of 1. In some instance, these distance values are generated by a distance field estimator or through various blurring algorithms known to the computing device on which the user interface element 320 is to be rendered. It is important that the distance field be generated correctly for each region so that when the various distance points are resampled after the image rotates, such as shown in FIG. 3C, the resampled distances may be used to determine: 1) whether a pixel should be displayed at that point and 2) whether the pixel should be anti-aliased (using for example, a constant filter width).

The distance value of each region in the quantization grid 325 may also provide information as to a location of each point on the quantization grid 325 with respect to inner pixel boundaries of the user interface element 320 or outer pixel boundaries of the user interface element 320. For example, as shown in FIG. 3B, the values in each region of the quantization grid 325 have a positive value or a negative value to indicate whether the region is located inside the user interface element 320 or the outside of the user interface element 320. Although positive values are shown on the outside of the user interface element 320 and negative values are shown on the inside of the user interface element 320, the signs may be reversed.

Figure 3C:
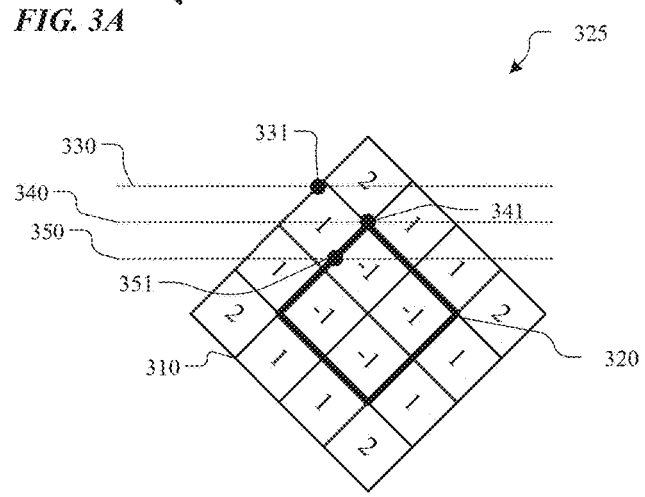
FIG. 3C illustrates the rotated quantization grid and user interface element of FIG. 3B according to one or more embodiments of the present disclosure.

When the quantization grid 325 for a particular user interface element 320 has been determined, the user interface element 320 may rotate such as shown in FIG. 3C. However, as the user interface element rotates, the quantization grid 325 and the image boundary 310 rotate accordingly. As such, the distance values associated with each region in the quantization grid 325 are maintained.

Once the user interface element 320 has been rotated, a scan line rasterization process may commence. In FIG. 3C, the scan line rasterization process is represented by dotted lines 330, 340, and 350 respectively. Although three scan lines are shown, it is contemplated that multiple scan lines may be used to select multiple points on the quantization grid 325.

For example, scan line rasterization 330 may select point 331 on the quantization grid 325. Once the point 331 is selected, a texture sampler, such as, for example, texture sampler 240 of FIG. 2, may sample the four adjacent neighbors to point 331. As shown in FIG. 3C, the four adjacent or nearest neighbors have distance values 2, 1, 1, −1. These four values are summed and then multiplied by a fractional distance, such as, for example, the distance from the point 331 to the center of the user interface element 320, to determine a distance that point 331 is from a pixel boundary of the user interface element 320.

Continuing with the example above, after performing the summation and multiplication described, the distance value associated with point 331 may be approximately 2. This value indicates that point 331 is outside the user interface element 320 (because it is a positive integer). Further, given that the distance is approximately 2, and further given that the pixel boundary of the user interface element 320 is located at zero, it may be determined that this point is not close to a pixel boundary. Thus, no pixel will be displayed at point 331 and an anti-aliasing process need not occur.

The next scan line 340 may pick a second point represented as point 341 on the quantization grid 325. As shown in FIG. 3C, the four neighboring regions of point 341 has values of 2, 1, 1, and −1 respectively. These four values are also summed and multiplied by a fractional distance value as described. However, the resulting value from this calculation may be closer to zero (or some fractional value that is between 0.1 and −0.1). This value indicates that the point 341 is slightly off of the pixel boundary but also slightly on the pixel boundary. Accordingly, a pixel will be output at point 341 and an anti-aliasing filter may be applied to blur out at least a portion of the pixel at this point.

The next scan line rasterization 350 selects point 351 on the quantization grid. The texture sampler may then determine that the four nearest neighbors to point 351 have values of 1, 1, −1 and −1 respectively. These values are summed and multiplied by a fractional distance such as described above. In this exemplary scenario, the distance value that is returned is approximately zero. Because the point 351 is close to zero, a pixel may be output at point 351. Further, because point 351 is so close to a pixel boundary of the user interface element 320, no anti-aliasing filter may be required (although one could still be applied).

Figure 4:
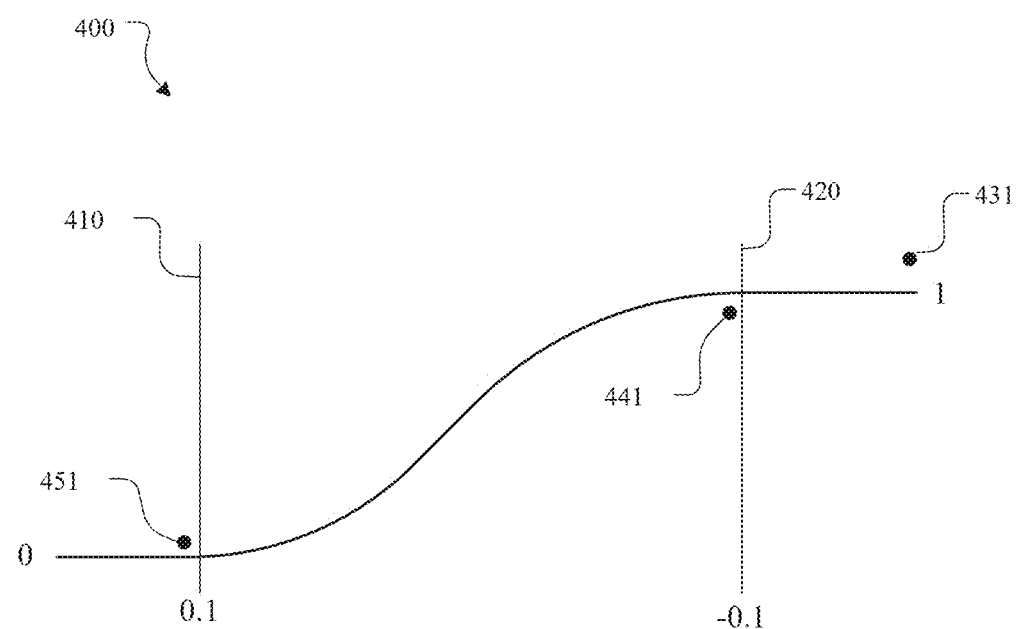
FIG. 4 illustrates an exemplary filter threshold graph according to one or more embodiments of the present disclosure.

FIG. 4 illustrates an exemplary filter threshold graph 400 for determining whether a point on a distance field should be displayed and/or anti-aliased according to one or more embodiments of the present disclosure. In certain embodiments, the filter threshold graph 400 may be used to determine a smoothness or sharpness of the rotated user interface element such as, for example, user interface element 320 (FIG. 3). In addition, the filter threshold graph 400 may be used to determine which points on the quantization grid are completely inside a pixel boundary (e.g., every point to the left of line 410), outside a pixel boundary (every point to the right of line 420), or fractionally inside or outside a pixel boundary (every point that is between lines 410 and 420).

For example, as shown in FIG. 4, point 451 is to the left of line 410 which indicates that the point 451 (which may correspond to point 351 of FIG. 3) may be mostly located on a pixel boundary of the user interface element. As such, when a pixel is displayed at point 351, an anti-aliasing filter may not need to be applied. As also shown in FIG. 4, point 441 (which may correspond to point 341 of FIG. 3) is slightly outside the pixel boundary based on its plot on the filter threshold graph 400. However, because the point 441 is relatively close to the pixel boundary, a pixel may be output at point 341. However, because a portion of the pixel at point 341 would extend past a pixel boundary, a slight anti-aliasing filter may be applied to this point in order to blur one or more edges of the pixel that extends from the pixel boundary.

Continuing with the example, point 431 (which may correspond to point 331 of FIG. 3) is to the far right of line 420. In this exemplary embodiment, this represents that point 431 is far removed from a pixel boundary. As result, no pixel will be displayed at that location and no anti-aliasing process is performed.

In embodiments, the slope of the filter threshold graph 400 may be any desired slope. Further, the distance between lines 410 and 420 may represent a common or constant filter width for an anti-aliasing process. The filter width may also vary based on, for example, a minimum feature width of an image. Put another way, although the filter width for a single image remains constant across all pixels of an image, the filter width may vary from image to image. For example, in some embodiments, the distance between lines 410 and 420 may vary based on a minimum width or a minimum height of a boundary of an image to be rotated.

Figure 5:
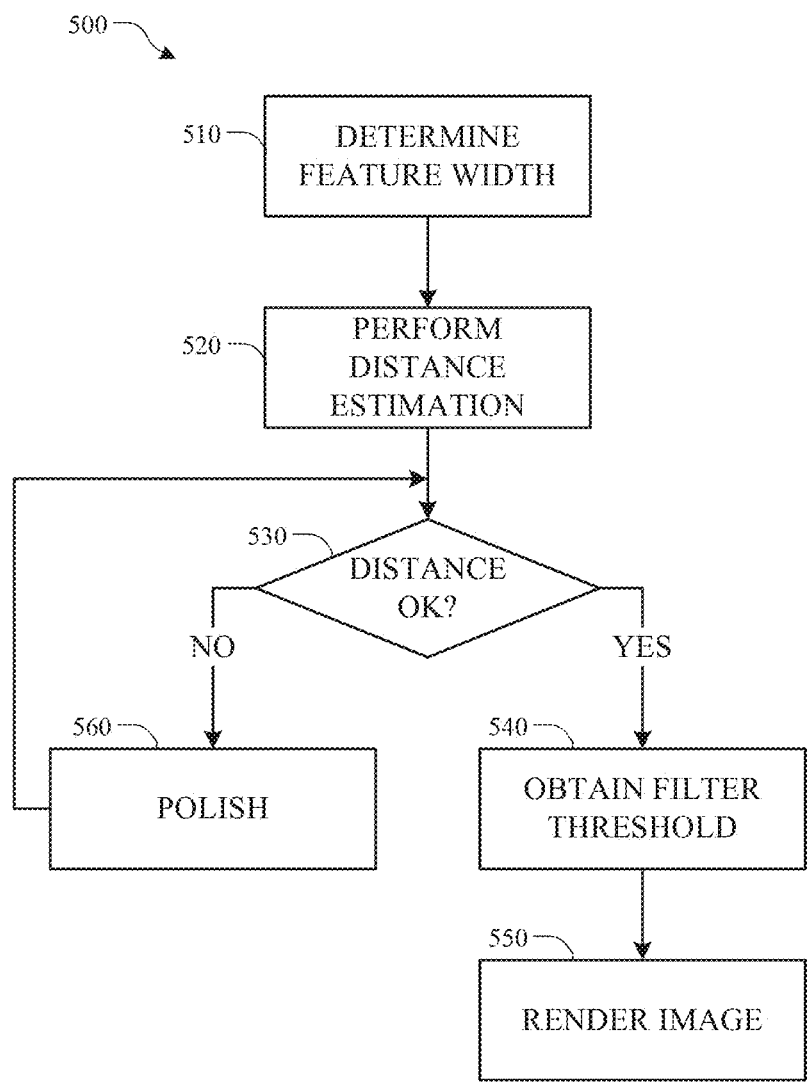
FIG. 5 illustrates a method for outputting and rotating images on a display.

FIG. 5 illustrates a method 500 for outputting and rotating images on a display. In certain embodiments, the method 500 may be used to generate and/or rotate multiple images on the display either separately, concurrently or substantially concurrently. Further, various images maybe displayed and/or rotated in sequence. In such embodiments, each user interface element may have its own distance field and filter width such as described below.

In addition to the above, the method 500 describes how to rotate rendered images on a display such that the rotated images are smooth, maintain sharp and/or rounded corners where desired (e.g., minor the original intent of the original image) while maintaining the original luminance of the original image. Further, the method 500 may be used to display any and all images that are to be rendered on a display regardless of whether an image is rotating or not rotating. In other embodiments, method 500 may be used to display images at discrete or selective times whether or not the image is rotating.

Method 500 begins at operation 510 when a feature width of an image is determined. Determining a feature width includes determining the original intent of the image or determining what the image represents. Put another way, determining the feature width includes determining an ideal or desired sharpness for the image. In some embodiments, the desired sharpness may vary based on the shape of the image, the size of the image and so on.

For example, if the image is a rounded rectangle, the feature width of the rounded rectangle would be the minimum of either the width of the rounded rectangle (e.g., a width in pixels of a border of the rounded rectangle) or the height of the rounded rectangle (e.g. a height in pixels of a border of the rounded rectangle). For an outlined rectangle, the minimum feature width would be the width of the outline. In another example, if the image is a straight line that is one pixel wide, the minimum feature width is one pixel.

Once the feature width has been determined, flow proceeds to operation 520 in which a distance estimation algorithm is applied to the image. In certain embodiments, the distance estimation algorithm is based, at least in part, on the determined feature width. Additionally or alternatively, the distance estimation algorithm may be based, at least in part, on what the image looks like.

In certain embodiments, applying a distance estimation algorithm may consist of applying a number of distance estimation algorithms that are known or otherwise available to the computing device on which the image is to be displayed. The distance estimation algorithms available to the computing device may be used to create the quantization grid (or a distance field) of the image such as, for example, quantization grid 325 (FIG. 3B). In certain embodiments, each region of the quantization grid may have a different distance estimation algorithm applied as will be described below.

Once the distance values for each region have been calculated, flow proceeds to operation 530 in which a determination is made as to whether the distance estimation algorithm was successful. More specifically, operation 530 determines whether the distance estimation algorithm generated a distance value that may be used to recreate a pixilated version of the image that matches the original vector image. As discussed above, the original vector image may be stored by the electronic device. Thus, a per pixel comparison, or a root square means comparison based on pixel differentiation, may be made between the newly created image and the original image. If the comparison is successful (e.g., the images match or match within a particular threshold), the distance values in each region of the quantization grid are correct.

In certain embodiments, the distance field values may be required to have the same resolution as the resolution of the original vector image. Accordingly, no compression may be performed on the quantization grid that was generated by the distance estimator.

If it is determined in operation 530 that the distance estimation algorithm that was applied to the image was not successful (e.g., portions of the pixelated image do not exactly match, or do not fall within a match threshold) corresponding portions of the original image, or that portions of the distance estimation algorithm were not successful in some of the regions of the quantization grid (e.g., some of the edges are not as sharp as desired), flow proceeds to operation 560 in which a polish is performed.

In certain embodiments, the polish may be performed on a per-region basis. That is, if the first region of the quantization grid matches a corresponding portion of the original image but a second region of the quantization grid is not as correct, a polish may be performed on the second region of the quantization grid. In embodiments, the polish consists of performing a new distance estimation algorithm on that particular region. Flow then proceeds back to operation 530 and the operation repeats.

If it is determined in operation 530 that the distance estimation was successful (e.g., the pixilated image is compared to the original image and desired results are achieved) flow proceeds to operation 540 in which a filter threshold or filter width for the image is determined. In some embodiments, the filter width is based, at least in part, on the image itself, the quality of the image, the distance field associated with the image and/or on the feature width associated with the image. For example, if the image is a straight line that is one pixel wide, the filter width that is applied may need to be small when compared to a line that is five pixels wide.

As discussed above, the filter width may be represented as the width between lines 410 and 420 of FIG. 4 and may be selected based on a desired sharpness of the image. In other embodiments, the filter width may be selected by a user, a program or application and the like. In certain embodiments, the determination of the filter threshold may occur simultaneously or substantially simultaneously with the distance field estimation or may occur after the distance field estimation is complete. The filter width may then be used in any anti-aliasing processes that are performed on the image. As discussed above, the filter width remains constant and is applied on each pixel (if present or displayed) of the image regardless of the location of the pixel and regardless of an orientation or rotation of the image.

Flow then proceeds to operation 550 in which the image is output on the display. In embodiments, the image may be output on the display by rasterizing the image and/or applying affine transforms to the image.

Figure 6:
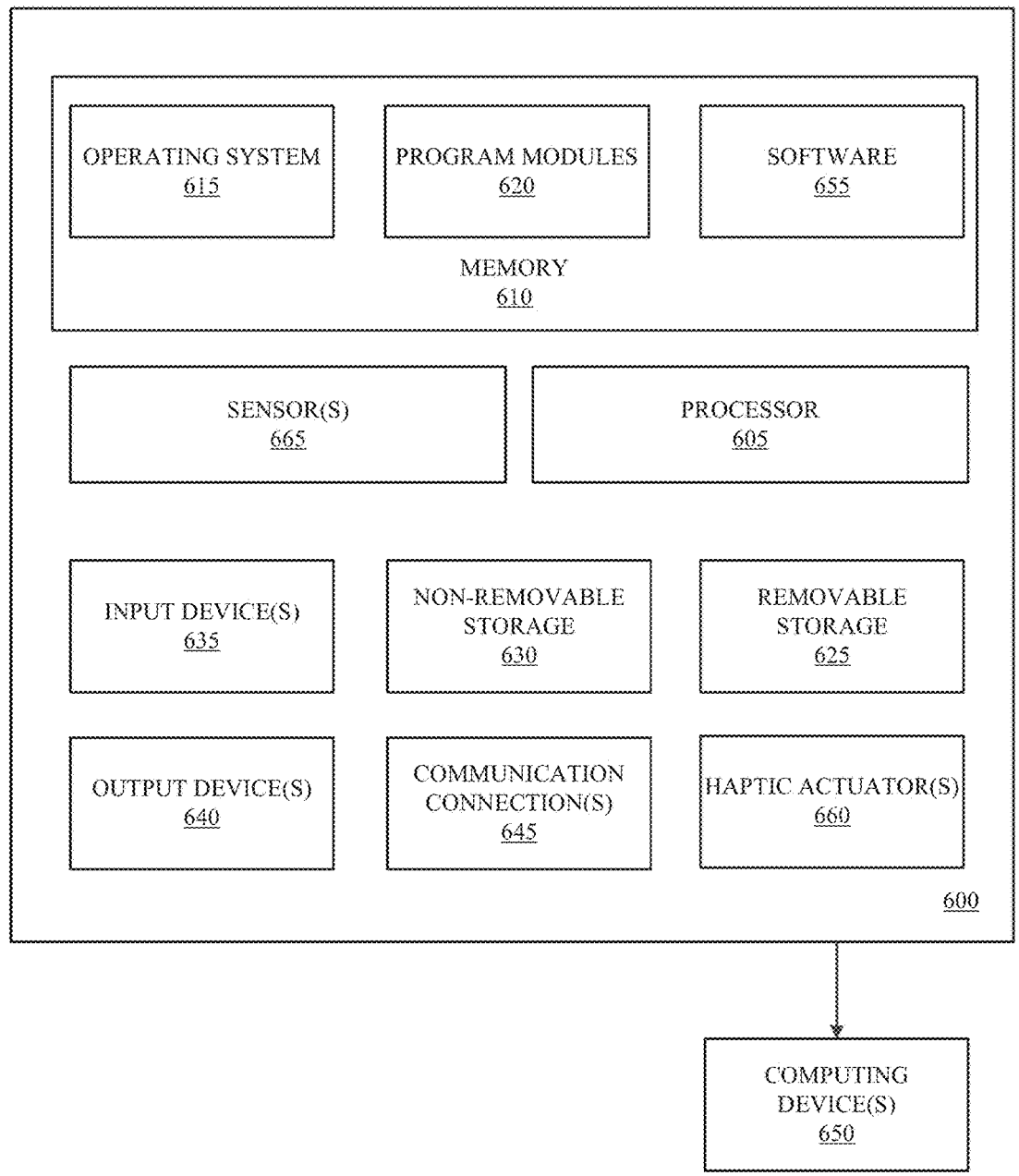
FIG. 6 is simplified block diagram of a computing device that may be used with one or more embodiments of the present disclosure.

FIG. 6 is a block diagram illustrating exemplary components, such as, for example, hardware components of a computing device 600 according to one or more embodiments of the present disclosure. In certain embodiments, the computing device 600 may be similar to the computing device 100 described above with respect to FIG. 1A-FIG. 1C. Although various components of the computing device 600 are shown, connections and communication channels between each of the components are omitted for simplicity.

In a basic configuration, the computing device 600 may include at least one processor 605 and an associated memory 610. The memory 610 may comprise, but is not limited to, volatile storage such as random access memory, non-volatile storage such as read-only memory, flash memory, or any combination thereof. The memory 610 may store an operating system 615 and one or more program modules 620 suitable for running software applications 655. The operating system 615 may be configured to control the computing device 600 and/or one or more software applications 655 being executed by the operating system 615. The software applications 655 may include browser applications, e-mail applications, calendaring applications, contact manager applications, messaging applications, games, media player applications, time keeping applications and the like.

The computing device 600 may have additional features or functionality than those expressly described herein. For example, the computing device 600 may also include additional data storage devices, removable and non-removable, such as, for example, magnetic disks, optical disks, or tape. Exemplary storage devices are illustrated in FIG. 6 by removable storage device 625 and a non-removable storage device 630. In certain embodiments, various program modules and data files may be stored in the system memory 610.

As also shown in FIG. 6, the computing device 600 may include one or more input devices 635. The input devices 635 may include a keyboard, a mouse, a pen or stylus, a sound input device, a touch input device, and the like. The computing device 600 may also include one or more output devices 640. The output devices 640 may include a display, one or more speakers, a printer, and the like. The computing device 600 may also include one or more haptic actuators 660 that are used to provide the haptic output. The computing device 600 may also include one or more sensors 665. The sensors may include, but are not limited to, accelerometers, ambient light sensors, gyroscopes, magnetometers and so on.

The computing device 600 also includes communication connections 645 that facilitate communications with additional computing devices 650. Such communication connections 645 may include a RF transmitter, a receiver, and/or transceiver circuitry, universal serial bus (USB) communications, parallel ports and/or serial ports.

As used herein, the term computer-readable media may include computer storage media. Computer storage media may include volatile and nonvolatile media and/or removable and non-removable media implemented in any method or technology for the storage of information. Examples include computer-readable instructions, data structures, or program modules. The memory 610, the removable storage device 625, and the non-removable storage device 630 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600.

The computing device 600 may also include a synchronization application or module (not shown) configured to synchronize applications or data resident on the computing device 600 with another computer or device.

In certain embodiments, the computing device 600 includes a power supply such as a battery, a solar cell, and the like that provides power to each of the components shown. The power supply may also include an external power source, such as an AC adapter or other such connector that supplements or recharges the batteries. The computing device 600 may also include a radio that performs the function of transmitting and receiving radio frequency communications. Additionally, communications received by the radio may be disseminated to the application programs. Likewise, communications from the application programs may be disseminated to the radio as needed.

The computing device 600 may also include a visual indicator, a keypad and a display. In embodiments, the keypad may be a physical keypad or a virtual keypad generated on a touch screen display. The visual indicator may be used to provide visual notifications to a user of the computing device. The computing device 600 may also include an audio interface for producing audible notifications and alerts.

In certain embodiments, the visual indicator is a light emitting diode (LED) or other such light source and the audio interface is a speaker. In other embodiments, the audio interface may be configured to receive audio input.

The audio interface may also be used to provide and receive audible signals from a user of the computing device 600. For example, a microphone may be used to receive audible input. In accordance with embodiments of the present disclosure, the microphone may also serve as an audio sensor to facilitate control of notifications such as described above. The system may further include a video interface that enables an operation of an on-board camera to record still images, video, and the like.

In one or more embodiments, data and information generated or captured by the computing device may be stored locally. Additionally or alternatively, the data may be stored on any number of storage media that may be accessed by the computing device using the radio, a wired connection or a wireless connection between the computing device and a remote computing device. Additionally, data and information may be readily transferred between computing devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

Further, regardless of whether the features shown and described herein are shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

We claim:

1. A method for displaying an image on a user interface, the method comprising:
   determining a minimum feature width of a user interface element of the image;
   determining, based on the minimum feature width, a distance field associated with the user interface element;
   generating a value for each region of the distance field based on a distance value associated with one or more neighboring pixels associated with the user interface element;
   comparing a pixelated version of the image to an original representation of the image;
   when results of the comparing the pixelated version of the image to the original representation of the image satisfies a threshold, determining a filter threshold associated with the distance field;
   using a filter having the filter threshold to generate a rotation of the user interface element, wherein the filter threshold is constant; and
   outputting the image on the user interface so as to include the rotation of the user interface element: wherein the filter threshold:
   is based on a sharpness of the image; and
   represents a distance from a pixel boundary within which anti-aliasing will be performed.

2. The method of claim 1, wherein the minimum feature width is at least one of a minimum height of a portion of the user interface element or a minimum width of the portion of the user interface element.

3. The method of claim 1, further comprising determining a second distance field for at least one region.

4. The method of claim 1, wherein determining the distance field further comprises determining a blended value of the one or more neighboring pixels.

5. The method of claim 1, wherein the distance field comprises fractional numbers.

6. The method of claim 1, wherein the comparing the image as output to the original representation of the image comprises performing a pixel by pixel comparison of the pixelated version of the image to the original representation of the image.

7. The method of claim 1, further comprising performing a scan line rasterization on a rotated distance field.

8. The method of claim 1, wherein generating the value for each region comprises a per pixel comparison.

9. A non-transitory computer-readable storage medium encoding computer executable instructions which, when executed by a processor, performs a method for outputting a rotation of an image on a display, the method comprising:
   determining a distance field corresponding to a region in the image, wherein the distance field comprises values based on distances between points in the region and a pixel boundary associated with the image;
   applying a filter having a constant filter width to a rotation of the distance field to generate a rotation of the image;
   comparing the rotation of the image with the image;

when a result of the comparing satisfies a threshold, outputting the rotation of the image on the display; and
maintaining the distance field as the image rotates on the display; wherein the constant filter width is:
based at least in part on the distance field values and a sharpness for the image; and
defined by a distance from a pixel boundary within which anti-aliasing is performed.

10. The non-transitory computer-readable storage medium of claim 9, wherein a value in the distance field value is a fractional value.

11. The non-transitory computer-readable storage medium of claim 9, further comprising instructions for determining a minimum feature width of the image.

12. The non-transitory computer-readable storage medium of claim 11, wherein the distance field values are based, at least in part, on the minimum feature width of the image.

13. The non-transitory computer-readable storage medium of claim 9, wherein the comparing comprises performing a pixel by pixel comparison of the rotation of the image with the image.

14. The non-transitory computer-readable storage medium of claim 9, further comprising instructions for performing a scan line rasterization with the filter on the rotation of the distance field.

15. A computing device, comprising:
a processor; and
a memory coupled to the processor, the memory for storing instructions which, when executed by the processor, performs a method for displaying an image on a user interface of the computing device, the method comprising:
determining a minimum feature width of a user interface element of the image;
determining, based on the minimum feature width, a distance field associated with the user interface element and with values associated with one or more neighboring pixels;
when a comparison of a version of the image generated using the distance field and the image satisfies a threshold, determining a filter threshold associated with the distance field;
using a filter having the filter threshold to generate a rotation of the user interface element, wherein the filter threshold is constant; and
outputting the image on the user interface so as to include the rotation of the user interface element; wherein the filter threshold:
is based on a sharpness of the image; and
is defined by a distance from a pixel boundary within which anti-aliasing will be performed.

16. The computing device of claim 15, wherein the minimum feature width is at least one of a minimum height of a portion of the image or a minimum width of the portion of the image.

17. The computing device of claim 15, wherein the values are determined based on distances between portions of the image and regions of a quantization grid.

18. The computing device of claim 17, further comprising instructions for determining a blended value of the one or more neighboring pixels.

* * * * *